June 4, 1946.  W. G. LUNDQUIST  2,401,694
OPPOSITE ROTATING PROPELLER DRIVE
Original Filed Sept. 2, 1939   2 Sheets-Sheet 1
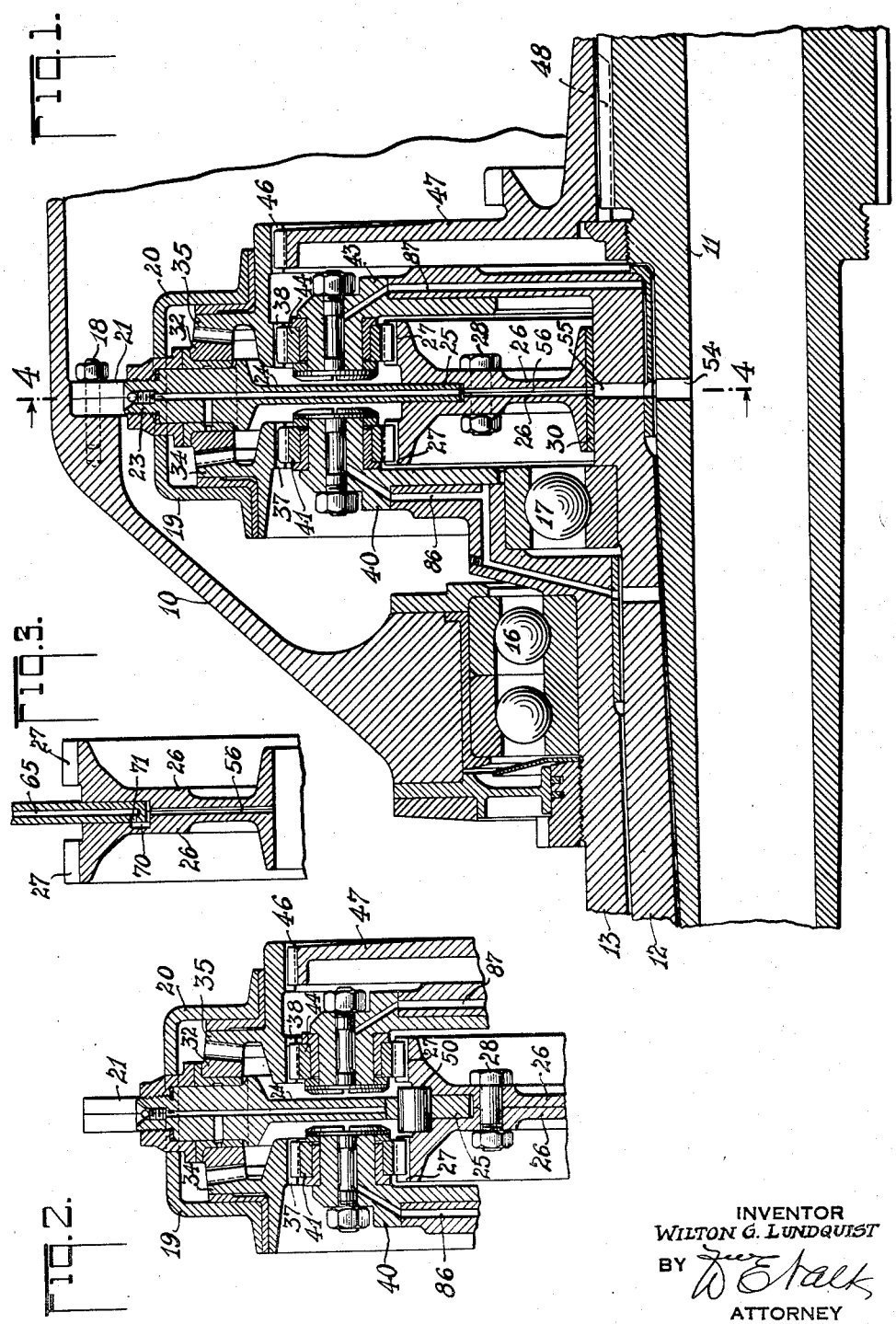
INVENTOR
WILTON G. LUNDQUIST
BY
ATTORNEY

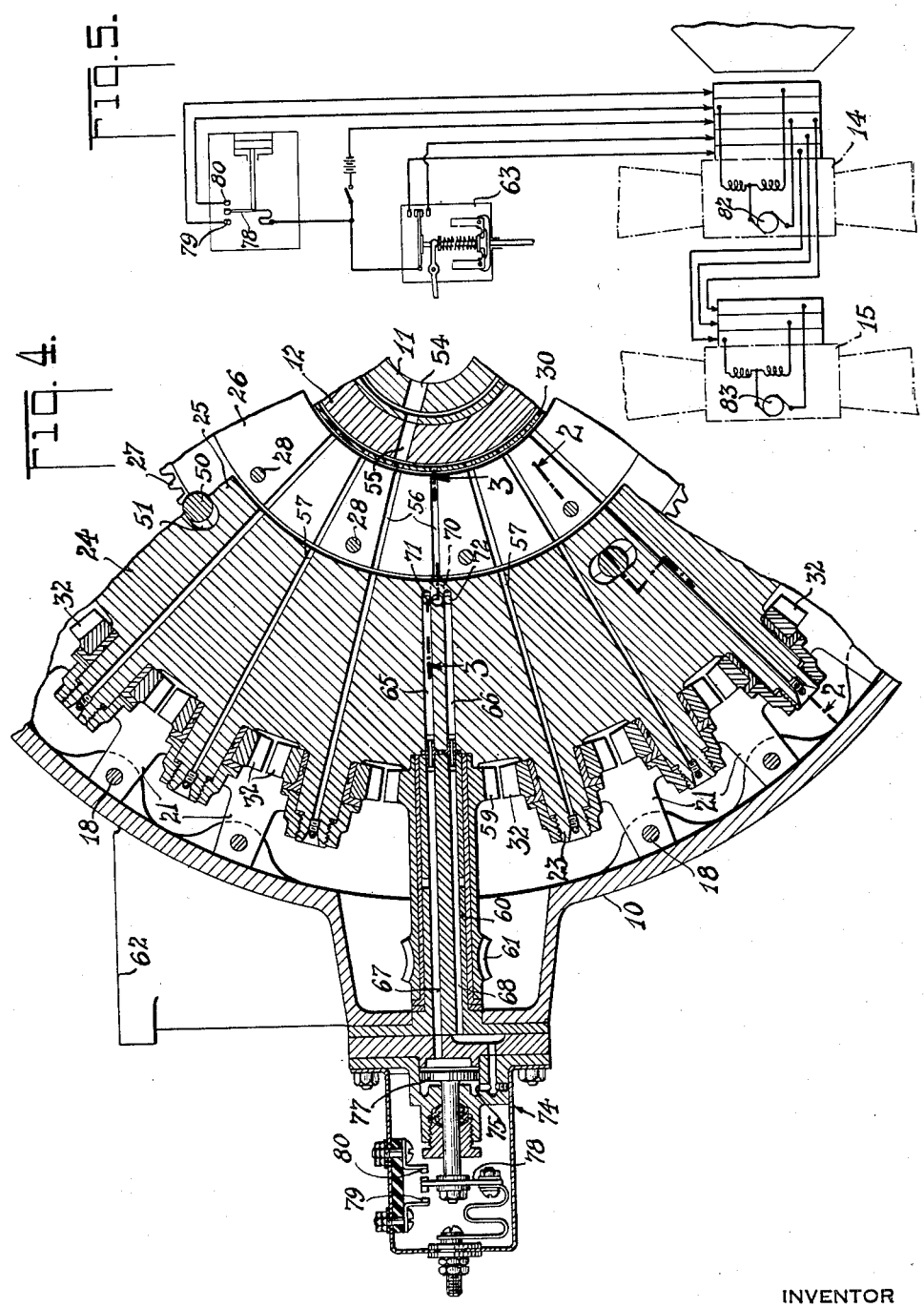

Patented June 4, 1946

2,401,694

UNITED STATES PATENT OFFICE 2,401,694

OPPOSITE ROTATING PROPELLER DRIVE

Wilton G. Lundquist, Hohokus, N. J., assignor to Wright Aeronautical Corporation, a corporation of New York Original application September 2, 1939, Serial No. 293,239. Divided and this application October 6, 1942, Serial No. 461,021

14 Claims. (Cl. 74—299)

This invention is a division of applicant's copending application, Serial No. 293,239, filed September 2, 1939, and relates to aircraft power plants and is concerned with tandem propellers oppositely driven by a single engine, and with the gearing and control means for the propellers.

An object of the invention is to provide a novel form of reduction gear having driven shafts rotating in opposite directions. A further object is to provide a reduction gear having a torque reaction member capable of oscillation in response to differential torque between oppositely rotating propellers. Still another object of the invention is to provide a tandem propeller reduction gear in which the speed of the two propellers is maintained uniform, and alternately to provide a gear in which the speed of the two propellers may differ but in which the torque of each is the same.

Further objects of the invention comprise the detailed structure of the embodiment shown in the drawings, in which:

Fig. 1 is a longitudinal section through an engine nose incorporating the reduction gear;

Fig. 2 is a fragmentary section of the reduction gear on a different radius, comprising in general a section on the line 2—2 of Fig. 4;

Fig. 3 is a fragmentary section of part of the gear on the line 3—3 of Fig. 4;

Fig. 4 is a transverse section through a sector of the gear taken in general on the line 4—4 of Fig. 1; and Fig. 5 is a wiring diagram of a tandem propeller control system.

In Figures 1 and 4, 10 represents an engine nose casing within which is disposed an engine power shaft 11 upon which are piloted concentric propeller shafts 12 and 13, the shaft 13 being adapted to carry a propeller such as 14 in Fig. 5, and the shaft 12 being adapted to carry a propeller such as 15 in Fig. 5. The shaft 13 is piloted in bearings 16 in the engine nose, while propeller thrust from the shaft 12 is transmitted through a bearing 17 between parts of the shafts 12 and 13.

Secured to the engine casing as at 18 are opposed annular bearing members 19 and 20, each of the latter having ears 21 abutting upon the engine casing. The outer rims of the members 19 and 20 are provided with a plurality of openings through which pass radial journals 23 rigid with a spider plate 24, the plate extending toward the shaft axes as at 25, to be embraced by opposed similar members 26 each carrying a sun gear 27. The members 26 are secured to one another by bolts 28 and are provided centrally thereof with a bushing at 30, in bearing engagement with the outer surface of the shaft 12. Upon each spider journal 23 is mounted a bevel pinion 32, the several pinions being engaged on opposite sides thereof by bevel gears 34 and 35, the outer faces of which are borne by the members 19 and 20. Each member 34 and 35 is formed as at 37 and 38 respectively as an internal gear, these internal gears being opposite the sun gears 27. The shaft 13 carries a spur pinion spider 40 having pinions 41 engaged with the ring gear 37 and the forward sun gear 27, while the shaft 12 is provided with a spur pinion spider 43 carrying spur pinions 44 engaged with the ring gear 38 and the rear sun gear 27. The bevel ring gear member, 35—38, carries a rearward splined extension 46 engaged by a correspondingly splined driving plate 47 keyed to the power shaft 11 as at 48.

The drive sequences through the system are as follows: The bevel gear 35 is directly driven by the engine through the drive plate 47 whereupon the ring gear 38 rotates the spider 43 in the same direction but at reduced speed, pinion reaction being taken through the sun gear 27. The bevel gear 35 drives the pinions 32 which in turn drive the bevel gear 34 at the same speed as the power shaft in the opposite direction. The ring gear 37 then drives the shaft 13 through the spider 40 in a direction opposite to the rotation of the shaft 12. It will be seen that the sun gears 27 take opposite reactions from the spiders 40 and 43, and if the loading on the shafts 12 and 13 is the same, the sun gears 27 will remain stationary and the two shafts will rotate at the same speed in opposite directions. However, if the loads on shafts 12 and 13 are dissimilar, the reactions on the sun gears 27 will be dissimilar whereby the sun gears will rotate jointly to equate the torque loading on respective driven shafts, which of course will permit said shafts to operate at different speeds but at similar torque.

Now, if the sun gears 27 be locked from rotation by the use of lugs 50 engaging in openings in the members 24 and 26, both shafts 12 and 13 will be forced to rotate at the same speed in opposite directions regardless of any torque load differential.

If the lugs 50 are arranged to permit of slight oscillation of the sun gears 27 as by elongated slots 51 in the member 24 as shown in Fig. 4, the lugs 50 will ride against one end of each of the slots 51 when one shaft is loaded more heavily than the other, while the lugs 50 will ride against the opposite end of each of the slots 51 if the other shaft be more heavily loaded than the said one shaft.

The oscillation of the sun gears may accordingly be used as a control means to govern the propellers for equal torsional loading, and, since the propellers are forced to rotate at the same speed, both propellers will absorb the same power.

The engine lubricating oil is used as a medium for effecting propeller control in the following manner: Pressure lubricating oil normally passes inside of the power shaft 11 and this is conducted through drillings 54 and 55 in the shafts 11 and 12 to a plurality of radial drilling 56 in the member 26. A plurality of radial drillings 57 are formed in the spider 24 to conduct lubricating oil to the bearings of the several pinions 32. However, one of these pinions is omitted as shown in Fig. 4, and is replaced with a pinion 59 journaled on a stub shaft 60 secured to the casing 10, said stub shaft having a wormwheel 61 suitable for driving a centrifugal governor for one controllable pitch propeller, which governor would be mounted upon a pad 62, the governor itself being shown diagrammatically in Fig. 5 at 63. The element 24 adjacent the axis of the shaft 60 is provided with parallel drillings 65 and 66 which continue through the shaft 60 as drillings 67 and 68 respectively. The web 26 of one of the sun gear units 27 is provided with an offset groove 70, as shown in Fig. 3, which may register with lateral openings 71 or 72 of the drillings 65 and 66 respectively, according to the position of oscillation of the sun gear. Thus, if the sun gear has oscillated against one extreme of its permissible travel, oil pressure will be opened to the drilling 65, while if it has oscillated it to its other extreme of travel, oil pressure will be imposed upon the drilling 66.

A control unit 74 comprises a cylinder 75 communicating at its inner end with the drilling 67 and at its outer end with the drilling 68. A piston 77 slidable within the cylinder carries a switch arm 78 contactable with switch points 79 or 80 according to the position of the sun gear. The switch points 79 and 80 are connected through slip rings, as shown in Fig. 5, to an electric motor 82 which serves to effect pitch changes in the propeller 14. The electric motor 83 which causes pitch change in the forward propeller 15 is controlled through a slip ring assembly by the centrifugal governor 63.

By this organization, the propeller 15 comprises the conventional constant speed apparatus where the propeller pitch is automatically controlled to maintain preset R. P. M. since the sun gears 27 do not permit any differential. However, if the rear propeller offers more or less resistance to rotation than the forward propeller, oscillation of the sun gear 27 will close the switch arm 78 with either contact 79 or 80 to cause correction of propeller pitch to the point where the torque load between the two propellers is balanced whereupon the sun gear will assume a center position so that oil flow from the drilling 56 is cut off from the drillings 65 and 66, in which event the reaction in the reduction gear from both propellers is exactly balanced and accordingly both propellers absorb identical power.

Fig. 1 shows provision for lubricating the spur pinions 41 and 44 through drillings 86 and 87 respectively disposed in the spider members 40 and 43 and associated parts, oil being fed thereto from interior of the shaft 11.

The reduction gear and associated control components provide an automatic system for propeller control and in addition, the reduction gear unit itself, if the control system be eliminated therefrom, is a compact and efficient gear transmission allowing of the use of oppositely rotating propellers whether of the fixed or controllable pitch type. Many of the parts are similar, simplifying manufacture, such parts being 19—20, 40—43, 27—27, pinions 32, pinions 41—44, and except for an additional driving spline, the elements 34—35. Although the specific showing of the drawings represents a preferred and practicable machine organization, it will be obvious to those skilled in the art that the proportions and detailed arrangements of the gears, journals, and the bearings may be changed. In the reduction gear shown, the planet system would provide a reduction ratio approaching two to one. If other gear ratios are desired, it is deemed within the scope of the invention to change the form of reduction gears per se to attain such other ratios.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In gearing for oppositely rotating propellers concentric with a drive shaft, an internal gear on the drive shaft having bevel gear teeth, a fixed bevel pinion spider with the pinions of which said bevel gear teeth engage, a sun gear connected to said spider, a first driven shaft having spur pinions engaged between said internal gear and sun gear, a second driven shaft having spur pinions engaging said sun gear, and a second internal gear engaging the spur pinions of said driven shaft and having bevel gear teeth driven by said bevel pinions.

2. In gearing for oppositely rotating propellers concentric with a drive shaft, an internal gear on the drive shaft having bevel gear teeth, a fixed bevel pinion spider with the pinions of which said bevel gear teeth engage, a sun gear connected to said spider, a first driven shaft having spur pinions engaged between said internal gear and sun gear, a second driven shaft having spur pinions engaging said sun gear, and a second internal gear engaging the spur pinions of said second driven shaft and having bevel gear teeth driven by said bevel pinions, said sun gear-bevel pinion spider connection allowing relative rotation between said sun gear and spider.

3. In gearing for oppositely rotating propellers concentric with a drive shaft, an internal gear on the drive shaft having bevel gear teeth, a fixed bevel pinion spider with the pinions of which said bevel gear teeth engage, a sun gear connected to said spider, a first driven shaft having spur pinions engaged between said internal gear and sun gear, a second driven shaft having spur pinions engaging said sun gear, and a second internal gear engaging the spur pinions of said second driven shaft and having bevel gear teeth driven by said bevel pinions, said sun gear-bevel pinion spider connection including means to inhibit rotation of said sun gear.

4. In gearing for oppositely rotating propellers concentric with a drive shaft, an internal gear on the drive shaft having bevel gear teeth, a fixed bevel pinion spider with the pinions of which said bevel gear teeth engage, a sun gear connected to said spider, a first driven shaft having spur pinions engaged between said internal gear and sun gear, a second driven shaft having spur pinions engaging said sun gear, and a second internal gear engaging the spur pinions of said second driven shaft and having bevel gear teeth driven by said bevel pinion, said sun gear-bevel pinion spider connection having a small degree of rotational freedom whereby the sun gear moves forwardly or reversely according to the torque load on one or the other propeller.

5. A reduction gear for tandem propellers comprising in combination an engine nose, a bevel pinion spider secured thereto at its outer ends, said spider including spaced gear bearings, bevel gears on each side of the spider meshed with the pinions and carried by said bearings, each said gear having internal spur teeth thereon, a sun gear assembly having gear teeth opposite the internal teeth of respective bevel gears, spur pinion spiders on each side of said sun gear assembly having pinions engaged with respective sets of sun and internal teeth, a driving connection to one of said bevel gears, and driven shafts connected to respective spur pinion spiders.

6. A reduction gear for tandem propellers comprising in combination an engine nose, a bevel pinion spider secured thereto at its outer ends, said spider including spaced gear bearings, bevel gears on each side of the spider meshed with the pinions and carried by said bearings, each of said gears having internal spur teeth thereon, a sun gear assembly having gear teeth opposite the internal teeth of respective bevel gears, spur pinion spiders on each side of said sun gear assembly having pinions engaged with respective sets of sun and internal teeth, a driving connection to one of said bevel gears, driven shafts connected to respective spur pinion spiders, and means to secure the sun gear assembly to the bevel pinion spider.

7. A reduction gear for tandem propellers comprising in combination an engine nose, a bevel pinion spider secured thereto at its outer ends, said spider including spaced gear bearings, bevel gears on each side of the spider meshed with the pinions and carried by said bearings, each of said gears having internal spur teeth thereon, a sun gear assembly having gear teeth opposite the internal teeth of respective bevel gears, spur pinion spiders on each side of said sun gear assembly having pinions engaged with respective sets of sun and internal teeth, a driving connection to one of said bevel gears, driven shafts connected to respective spur pinion spiders, and means to secure the sun gear assembly to the bevel pinion spider for limited oscillation.

8. In combination, a drive shaft, a pair of propeller shafts concentric with said drive shaft, reduction gearing for driving said propeller shafts in opposite directions, said gearing comprising a pair of internal gears driven in opposite directions by said drive shaft, sun gear means having gear teeth opposite the teeth of said internal gears, one of said propeller shafts having a plurality of pinions engaged between said sun gear means and one of said internal gears, and the other of said propeller shafts having a plurality of pinions engaged between said sun gear means and the other of said internal gears.

9. In the combination recited in claim 8 in which said sun gear means is rotatably mounted.

10. In combination, a drive shaft, a pair of propeller shafts concentric with said drive shaft, reduction gearing for driving said propeller shafts in opposite directions, said gearing comprising a pair of gear members each having internal gear teeth and having facing bevel gear teeth, a fixed spider having bevel pinions interposed between the facing bevel gear teeth of said gear members, sun gear means, one of said propeller shafts having a plurality of pinions engaged between said sun gear means and the internal gear teeth of one of said gear members, the other of said propeller shafts having a plurality of pinions engaged between said sun gear means and the internal gear teeth of the other of said gear members, and a drive connection from said drive shaft to one of said gear members.

11. In combination, a driving shaft, a pair of driven shafts concentric with said driving shaft, a planetary gear drive connection between the driving shaft and one of said driven shafts, and an oppositely rotating planetary gear drive connection between the driving shaft and the other of said driven shafts, said planetary gear drives each comprising a rotatable annular drive gear and one or more planet pinions engageable therewith, and a rotatably mounted annular reaction gear member common to both said planetary gear drives and engageable with their planet pinions.

12. In a transmission between a single shaft and a pair of shafts, a reaction member, means to urge said member in one direction in response to the loading of one of said pair of shafts, means to urge said gear in an opposing direction in response to the loading of the other of said pair of shafts, a source of fluid pressure, a fluid motor, and valve means operable to control said fluid motor in response to movements of said reaction member.

13. In a transmission, a driving shaft, a pair of driven shafts concentric with said driving shaft, a pair of gears concentric with said shafts, means to oppositely drive said gears at the same speed, reduction gear means drivably connecting one of said gears and one of said driven shafts, and reduction gear means drivably connecting the other of said pair of gears and the other of said driven shafts.

14. In a transmission for a pair of concentric shafts, a fixed spider structure having a plurality of radial arms, bevel pinions carried by said arms, a pair of bevel gear members disposed on opposite sides of said spider in mesh with said bevel pinions, means to drive one of said bevel gear members in one direction whereby the other bevel gear member is driven in the opposite direction, reduction gear means drivably connecting one of said bevel gear members and one of said shafts, and reduction gear means drivably connecting the other of bevel gear members and the other of said shafts.

WILTON G. LUNDQUIST.